US012756922B2

(12) United States Patent
Buerkle et al.

(10) Patent No.: US 12,756,922 B2
(45) Date of Patent: Oct. 6, 2026

(54) PREDICTIVE EXPOSURE SETTINGS FOR FIXED AND/OR MOBILE IMAGING

(71) Applicant: Intel Corporation, Santa Clara, CA (US)

(72) Inventors: Cornelius Buerkle, Karlsruhe (DE); Fabian Oboril, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 18/396,755

(22) Filed: Dec. 27, 2023

(65) Prior Publication Data

US 2024/0397188 A1 Nov. 28, 2024

(30) Foreign Application Priority Data

May 24, 2023 (DE) .................... 10 2023 113 601.1

(51) Int. Cl.

| | |
|---|---|
| ***H04N 23/61*** | (2023.01) |
| ***G06T 7/11*** | (2017.01) |
| ***G06T 7/20*** | (2017.01) |
| ***G06V 10/74*** | (2022.01) |
| ***H04N 23/73*** | (2023.01) |

(52) U.S. Cl.

CPC ............... *H04N 23/61* (2023.01); *G06T 7/11* (2017.01); *G06T 7/20* (2013.01); *G06V 10/761* (2022.01); *H04N 23/73* (2023.01); *G06T 2207/30168* (2013.01)

(58) Field of Classification Search

CPC .... H04N 23/61; H04N 23/73; H04N 23/6812; H04N 23/72; G06T 7/11; G06T 7/20; G06T 2207/30168; G06V 10/761

See application file for complete search history.

(56) References Cited

U.S. PATENT DOCUMENTS

| | | | | |
|---|---|---|---|---|
| 10,506,172 B2 * | 12/2019 | Welker | ................. | H04N 23/661 |
| 11,145,076 B1 * | 10/2021 | Horesh | ...................... | G06T 7/74 |
| 12,184,974 B1 * | 12/2024 | Grundhoefer | .......... | H04N 23/61 |
| 12,361,692 B2 * | 7/2025 | Hung | ...................... | G06V 40/23 |
| 2008/0099662 A1 * | 5/2008 | Musiel | .................... | G01S 7/497 250/205 |

(Continued)

OTHER PUBLICATIONS

Pratzner, Alex et al.; "Exposure time"; retrieved from https://www.photocourse.info/exposure-time.php on Nov. 14, 2023; 5 pages.

(Continued)

*Primary Examiner* — Chiawei Chen

(74) *Attorney, Agent, or Firm* — Viering, Jentschura & Partner mbB

(57) ABSTRACT

Disclosed herein are devices, systems, and methods for a predictive imaging system to determine exposure-related settings for a scene that is to be captured by an imagining device. The predictive imaging system determines a motion of the scene that is to be captured by an image sensor of the imaging device and determines an exposure-related configuration setting of the imaging device, where the exposure-related configuration setting is based on the determined motion of the scene. The predictive imaging system then generates an instruction for the imaging device to capture the scene using the determined configuration setting.

19 Claims, 8 Drawing Sheets

(56) References Cited

U.S. PATENT DOCUMENTS

| | | | | |
|---|---|---|---|---|
| 2009/0115860 | A1* | 5/2009 | Nakashima | H04N 23/68 348/208.99 |
| 2009/0231453 | A1* | 9/2009 | Huang | H04N 5/144 382/103 |
| 2012/0236173 | A1* | 9/2012 | Telek | H04N 23/62 348/E9.051 |
| 2012/0314123 | A1* | 12/2012 | Lee | H04N 23/64 348/E5.037 |
| 2012/0320218 | A1* | 12/2012 | Mori | H04N 23/56 348/E5.09 |
| 2014/0368695 | A1* | 12/2014 | Sako | H04N 9/7904 348/231.99 |
| 2018/0041696 | A1* | 2/2018 | Balasubramanian | G06F 16/5866 |
| 2018/0054559 | A1* | 2/2018 | Welker | H04N 23/661 |
| 2018/0324358 | A1* | 11/2018 | Yamada | H04N 23/73 |
| 2020/0396367 | A1* | 12/2020 | Segapelli | H04N 23/61 |
| 2021/0223664 | A1* | 7/2021 | Maharshi | G03B 11/00 |
| 2022/0329739 | A1* | 10/2022 | Kaneko | H04N 23/672 |
| 2023/0005239 | A1* | 1/2023 | Xu | H04N 23/72 |
| 2023/0283886 | A1* | 9/2023 | Kocienda | G06V 10/147 |
| 2023/0334838 | A1* | 10/2023 | Hung | G06V 10/62 |
| 2024/0121515 | A1* | 4/2024 | Jayanth | G06T 7/70 |

OTHER PUBLICATIONS

Richards, Matthew; "Motion Photography—Motion photography: how to capture movement in your images"; retrieved from https://www.canon.co.uk/get-inspired/tips-and-techniques/capturing-motion/#:~:text=A%20shutter%20speed%20of%201,sec%20or%20quicker%20are%20preferred on Nov. 14, 2023; 19 pages.

Grunnet-Jepsen, Anders et al.; "Projectors for Intel® RealSense™ Depth Cameras D4xx"; retrieved from https://www.intelrealsense.com/wp-content/uploads/2019/03/WhitePaper_on_Projectors_for_RealSense_D4xx_1.0.pdf on Nov. 14, 2023; 14 pages.

Sharpen AI; "AI-powered image sharpener that produces natural results"; retrieved from https://www.topazlabs.com/sharpen-ai on Nov. 14, 2023; 17 pages.

Apple; "Exposure to vibrations, like those generated by high-powered motorcycle engines, might impact iPhone cameras"; retrieved from https://support.apple.com/en-ke/HT212803 on Nov. 14, 2023; dated Nov. 1, 2023; 2 pages.

* cited by examiner

PREDICTIVE EXPOSURE SETTINGS FOR FIXED AND/OR MOBILE IMAGING

CROSS-REFERENCE TO RELATED APPLICATION(S)

This application claims priority to German Patent Application No. 10 2023 113 601.1 filed on May 24, 2023, the contents of which are fully incorporated herein by reference.

TECHNICAL FIELD

This disclosure relates generally to imaging systems, and in particular to imaging devices (e.g., cameras) that may be moving while capturing a scene and/or that may be capturing a scene with objects that are moving relative to the scene.

BACKGROUND

Imaging systems (e.g., visual cameras, Light Detection and Ranging (LiDAR) systems, infrared (IR) cameras, depth cameras, etc.) are located on a variety of equipment, including on small personal devices for capturing casual photos or on (autonomous) vehicles that rely on imaging systems for localization, navigation, and/or safety. An imaging system generally perceives the environment by capturing a scene (e.g., the region that is within the "view" of the imaging system) in a frame or series of frames. To capture a scene, typical imaging systems rely on sensors such as visual (red-green-blue (RGB) light) sensors and/or infrared sensors that detect incident waves of light or other electromagnetic radiation and convert the detected incident waves to an image.

A common problem with image sensors is that the sensor (e.g., a charge-coupled device sensor (CCD), an active-pixel sensor (CMOS), etc.) must be exposed to the scene for a certain amount of time (exposure time) in order to gather the light emitted (or reflected) from the environment. Complex algorithms may be used to determine the length of the exposure time, based on the current light within the scene. Various exposure-related settings may be configured to avoid under-exposing the scene (e.g., where parts of the scene are too dark) or over-exposing the scene (e.g., where parts of the scene are too bright), including, for example, settings such as exposure time, aperture size, gain, etc. However, when there is motion in the scene relative to the image sensor (e.g., because the light sensor is moving relative to the scene and/or because objects within the scene are moving relative to the scene), this may result in a blurry or distorted image-representation of the scene (e.g., motion blur). Motion blur may be particularly problematic for imaging systems that are used on mobile devices (e.g., for robots, autonomous vehicles, and other mobile equipment), where the imaging system may be constantly moving with respect to the scene that it is capturing and/or the scene may include objects that are moving with respect to the scene.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
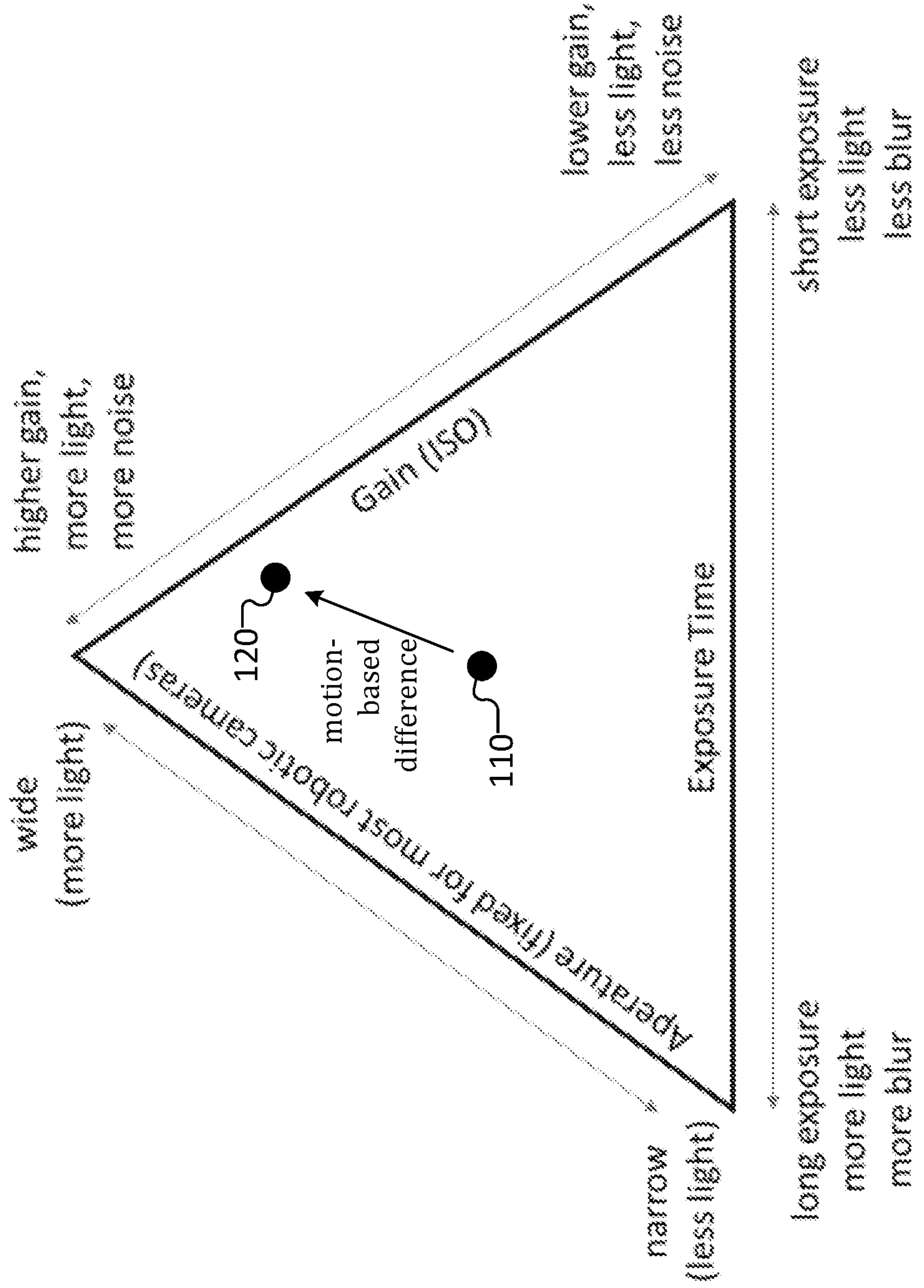
FIG. 1 shows an example of exposure-related settings that may be adjusted to account for relative motion when capturing a scene.

The following detailed description refers to the accompanying drawings that show, by way of illustration, exemplary details and features.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radio frequency (RF) transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others.

The term "autonomous vehicle" may describe a vehicle capable of implementing at least one vehicle maneuver without driver input. A vehicle maneuver may describe or include a change in one or more of steering, braking, acceleration/deceleration, etc. of the vehicle. A vehicle may be described as autonomous even in case the vehicle is not fully automatic (for example, fully operational with driver input or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances, but may leave other aspects of vehicle navigation to the driver during other circumstances (e.g., braking under certain circumstances). Autonomous vehicles may also include vehicles that share the control of one or more aspects of vehicle maneuver implementation/planning under certain circumstances (e.g., hands-on, such as responsive to a driver input) and vehicles that control one or more aspects of vehicle maneuvering under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle.

An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

As noted above, imaging systems such as visual cameras, Light Detection and Ranging (LiDAR) systems, infrared cameras, depth cameras, etc. may be located on a variety of equipment, including not only small personal devices such as smartphones for capturing casual photos but also on vehicles (e.g., autonomous vehicles) that may rely on captured images for localization, for navigation, for safety systems, and/or for guidance, just to name a few. However, conventional exposure algorithms of imaging systems consider only the currently available light of the captured scene to determine the exposure time and other exposure-related settings of the imaging system. As a result, the relative motion of scene may not be considered and motion blur may result when there is relative motion of the scene. If the motion blur is high for images captured by an autonomous vehicle, for example, this may cause inaccuracies or failures in the localization, navigation, safety, and/or guidance systems of in the vehicle. As a result, the autonomous vehicles may be forced to limit the extent of their movement (e.g., limited speeds, limited turning, limited acceleration/deceleration, etc.) to increase reliability and ensure safety.

To reduce motion blur, the predictive imaging system disclosed below may determine exposure time (and other exposure-related imaging device settings) based on a prediction of the relative motion (also called "relative movement") expected in the scene that is to be captured. Using a mobile robot as an example, the expected future motion(s) of the robot (e.g., velocity, acceleration, turns, etc. of a planned path of the robot) may be used along with the current motion and incident light to determine the optimal exposure settings. In addition, to the extent that the robot may track the movement of objects in the environment, the predictive imaging system may also use the expected motion of objects to determine the expected relative motion of objects (relative to the scene and the motion of the imaging device) and use the expected relative motion to determine exposure-related imaging device settings in order to reduce motion blur of the to-be-captured image of the scene that includes the object(s). As should be understood, the "object" may be any type of object and may not necessarily be a mobile object like a pedestrian, vehicle, etc. For example, a stationary wall, house, or landscape may be an object for which there is relative movement with respect to the scene (e.g., because the imaging device is moving relative to the otherwise stationary object). As used herein, the motion relative to the scene may be referred to as "relative motion" or "relative movement" and may refer to the motion caused by motion of an object(s) in the scene and/or the motion of the imaging device with respect to objects in the scene.

The predictive imaging system disclosed in more detail below may utilize and/or update a mapping of expected light conditions, predefined exposure settings, etc. for the area in which the imaging system is operating. A mobile robot operating in a factory environment, for example, may utilize the information in the exposure map to quickly obtain preferred exposure settings for the robot's imaging system at a given location on the map. Consequently, when the robot moves quickly through the environment, the image sensor may quickly obtain exposure settings that result in an image with reduced motion blur. As should be appreciated, there may be a tradeoff when selecting exposure-related imaging device settings for capturing a given scene. For example, one set of imaging device settings may be optimized to reduce motion blur but may result in under-exposed images, which may be compensated with a higher gain setting, resulting in a higher noise that is tolerable for the given purpose. As should be understood, what image sensor configuration settings are "optimal" for a given scene may be a matter of design choice. Irrespective of what image sensor configuration settings are used, the benefit of the predictive imaging system disclosed below is that it may, when determining the image sensor configuration, take into account the anticipated light condition at a future point in time of a scene along the robot's path, the expected motion of the robot with respect to the scene at the future point in time, and/or anticipated motion of objects with respect to the scene at the future point in time.

It should be understood that the predictive imaging system disclosed below is different from conventional post-processing for images that attempts to remove/reduce motion blur. For example, artificial intelligence (AI)-based post-processing solutions may remove/reduce motion blur of an already-captured image, but these are performed as post-processing steps and, in addition, may be limited in their usefulness to visual (RGB) cameras, where such post-processing for a stereo/depth cameras may be able to provide deblurring but may also result in inaccurate distance measurements. In addition, modern smartphones may have a number of algorithms to remove/reduce motion blur, but these also rely on post-processing (e.g., capturing multiple images (with short exposure times) and then stitching these together in a complex post-processing step to reduce motion blur). Such post-processing algorithms may be less helpful for an autonomous vehicle's imaging system that utilizes a virtually continuous stream of image frames. If every frame needs to be post-processed to reduce motion blur, this may require too many computing resources and/or may result in the robot perceiving the environment too slowly.

As should be understood, while such conventional post-processing may be used alongside the predictive imaging system disclosed below, one of the benefits of the predictive imaging system disclosed below is that it may calculate—in advance (proactively)—the imaging device configuration settings (e.g., exposure settings) so as to reduce the likelihood of capturing a blurry image in the first instance, reducing the need for post-processing.

In addition, the predictive imaging system disclosed below may be applicable to any type of camera used in any type of environment, not limited to use by automobiles or mobile robots. For example, even stationary infrastructure cameras that monitor, for example, traffic may benefit from the predictive imaging system disclosed below by predicting (or receiving an information message indicating) that a vehicle will be arriving to an intersection at a certain speed at night (e.g. from a LiDAR sensor or a vehicle-to-anything (V2X) message). Then, the infrastructure camera at the intersection may select a shorter exposure time that reduces blur and/or overexposure that may be caused by the vehicle's speed and/or light introduced by the arriving car's headlights. On the other hand, if the prediction is that the to-be-captured scene will be free of moving vehicles or other objects in motion, longer exposure times may be used. Once an object is scheduled to or predicted to arrive in the scene, the infrastructure camera may switch back to the shorter exposure time.

As another example, the predictive imaging system may be applicable to smartphones (e.g., a camera phone), where the smartphone's movement may be provided by global positioning system (GPS) sensors and/or inertial measurement unit (IMU) to detect the direction in which the camera is pointing. Then, by correlating the smartphone's position and camera-direction to map data, the predictive imaging system may estimate an expected object speed based on the smartphone's location and orientation (e.g., based on the usual speed of objects at this this location/orientation), determine the relative motion of the scene, and adjust the exposure settings for the camera based on the determined relative motion. For example, if the smartphone's camera is pointed towards a highway (e.g., where there is traffic moving at an average, "usual" speed that is fast), the predictive imaging system may determine these expected environmental conditions from GPS information and map data, and then select a short exposure time (or other exposure settings associated with relative movement that is fast). If the smartphone's camera is pointed to a static scene such as a landmark or other building (e.g., where moving objects are not usually expected), the predictive imaging system may select a slower exposure time (or other exposure setting associated with slow/no relative movement). As should be appreciated, the predictive imaging system may use artificial intelligence algorithms to detect which kind of objects are expected to be within a to-be-captured image (e.g., whether fast-moving objects and/or slow-moving objects will be present) and adjust the exposure settings accordingly.

In short, the predictive imaging system disclosed below may adjust its exposure settings based on the predicted relative motion of the scene in order to obtain images with reduced (e.g., without) motion blur, even if there are moving objects in the scene and even if the imaging device is moving with respect to the scene. By using the information about the expected motion relative (e.g., the robot's motion and/or objects within the scene) as a basis for the exposure setting (e.g., exposure time), the captured images may be "frozen" images with little to no motion blur. As should be understood, the predictive imaging system is predictive in that it may take into account the expected motion—at a future point in time—into account, and not only the current motion. This allows for an advance adjustment of the exposure settings for the to-be-captured scene. The advanced time horizon may be just a few hundred milliseconds (e.g., a time horizon that is already available in typical autonomous systems and/or imaging systems).

FIG. 1 shows an example diagram of how exposure-related imaging device configuration settings (in this example, aperture, gain, and exposure time) that might be ideal for a static image may need to be changed to account for relative motion. For example, whereas point 110 may represent an optimal set of image configuration settings of exposure time (t), aperture, and gain (g) for a static image (e.g., where $t=t_0$, and $g=g_0$), the disclosed predictive imaging device may select a different set of image configuration settings 120 (e.g., where $t\neq t_0$, and/or $g\neq g_0$) based on the expected relative motion of the scene (e.g., expected motion of the imaging device with respect to the scene and/or expected motion of object(s) within the scene). Because exposure, gain, and aperture have an influence on light received by the imaging device and therefore impacts blur when there is relative motion, the predictive imaging system may take into account the predicted relative motion in order to compensate for that motion by, for example, adjusting the incident light (e.g., by changing the aperture size and/or exposure time), adjusting the gain, and/or determining to adjust other exposure-related imaging device settings in advance.

For a static scene, if the imaging device is moving, the relative object motion noted above (e.g., a relative motion with a velocity v) may be the speed of imaging device itself (e.g., the velocity of the vehicle or robot to which the imaging system is attached). However, if the scene itself contains a moving object, the velocity (v) for the scene may be a cumulative relative velocity of the object and the imaging device with respect to the scene. For example, if the imaging device is on or part of a mobile robot that is moving and the robot's perception system is tracking a moving object in the environment that is predicted to be within the scene to be captured, the cumulative relative speed for the scene may be the speed of the robot relative to the object. To the extent there are multiple objects (static or dynamic) in the environment that are predicted to have different speeds, headings, etc., the predictive imaging system may determine t and g settings (and/or other exposure-related imaging device configuration settings) for each object expected to be in the scene to be captured, and then select the imaging device settings based on a predefined criterion or criteria (e.g., select the settings associated with the smallest exposure time, etc.).

To determine an exposure setting (e.g., exposure time t and/or gain setting g) based on motion, defined physical principles for imaging may be used. For example, a common definition for standard photography is given in the following relationship:

$$(t, g) = f(A, F, S, v, h, d, t_0, g_0)$$

where A is the aperture (e.g. f2.0, which may be a standard aperture setting for fixed for robotic applications), F is the focal length (e.g. 50 mm), S is the sensor size (e.g. full frame, Advanced Photo System type-C (APSC), etc.), v is relative object velocity (which may have, for example, rotational and longitudinal components), h is the heading of the object(s) in the scene (relative to the to-be-captured scene) and d is the object distance. Finally, $t_0$ and $g_0$ are the default exposure time and gain for the current light conditions (e.g., for a purely static scene with no relative motion). Furthermore, it holds that for $v=0$, $t=t_0$, and $g=g_0$. However, if there is relative motion, $v\neq 0$, and thus $t<t_0$ and/or $g>g_0$. If the predictive imaging system determines the exposure time t first, it may then calculate the desired gain to compensate for a possibly underexposed image at the determined exposure time t. For this, the predictive imaging system may use standard camera algorithms.

As should be understood, the function that the predictive imaging system uses to determine the exposure-related settings and other configuration settings based on the relative motion is not limited to the function *f* shown above, and the predictive imaging system may use any function that relates any number of factors and may implement the function in any form. For example, the predictive imaging system may implement the function as lookup tables that associate input conditions to an exposure time, gain setting, and/or other configuration settings. As another example, and described in more detail below, the predictive imaging system may use logic (e.g., fuzzy logic, greedy logic, etc.) to iteratively determine the optimal settings based on predefined rule(s) and/or AI-algorithm associated with the inputs and/or outputs of the function.

Figure 2:
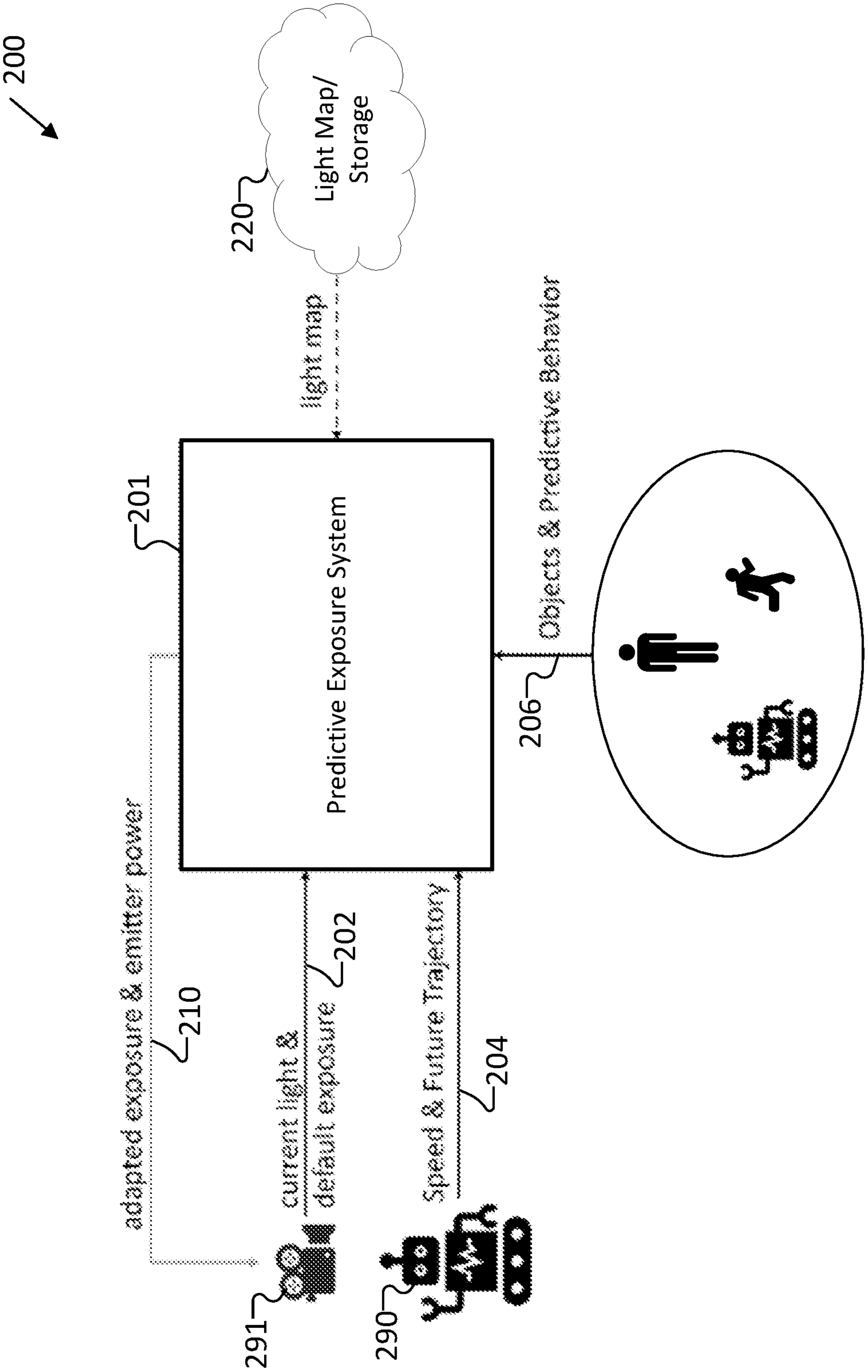
FIG. 2 shows an example of a predictive imaging system that may use estimated motion to improve image quality.

FIG. 2 shows a schematic view of a predictive imaging system 200 that may use a predictive exposure system 201 to determine configuration parameters for an imaging device 291 (e.g., a camera, LiDAR, depth camera, infrared camera, and/or other imaging system that has an image sensor to capture the scene). The predictive exposure system 201 may receive information related to a scene that is to be captured and determine configuration parameters (e.g., for a future time ("prediction time") at which the capture is to occur) for the imaging device 291 to use (e.g., at the prediction time) when capturing the image of the scene. For example, the predictive exposure system 201 may, at 202, receive (e.g., from imaging device 291) information about the light levels at the scene and may also receive default exposure settings for those light levels. The predictive exposure system 201 may also receive, at 204, information about whether the imaging device 291 (e.g., the robot 290 to which the imaging device 291 may be attached/integrated) is expected to be moving (e.g., its expected speed, trajectory, etc.) at the future time of the capture. The predictive exposure system 201 may also receive, at 206, information about objects that may be expected to be moving within the scene and their predicted behavior (e.g., speed, trajectory, etc.) at the future time of capture. The predictive exposure system 201 may also receive information about historical light conditions and/or associated imaging device configuration settings for the scene that may be stored in a storage device 220 (e.g., in a memory of an external/cloud-based server).

For example, the storage device 220 may be a database of historical light conditions and/or associated imaging device configuration settings for the environment that represents the environment divided into subregions (e.g., into cells), where each subregion (e.g., cell) has associated stored light conditions and/or associated imaging device configuration settings for the particular subregion. The predictive exposure system 201 may use any of this received information to determine imaging device configuration parameters (e.g., aperture, exposure time, gain, power levels of a light source (such as an LED emitter or flash bulb) directed to the scene, etc.) and provide the determined parameters, at 210, to the imaging device. As should be appreciated, the storage device 220 may be a memory and it may be located at the imaging device 291, at the robot 290, and/or at external server (e.g., a cloud- or edge-based server).

Figure 3:
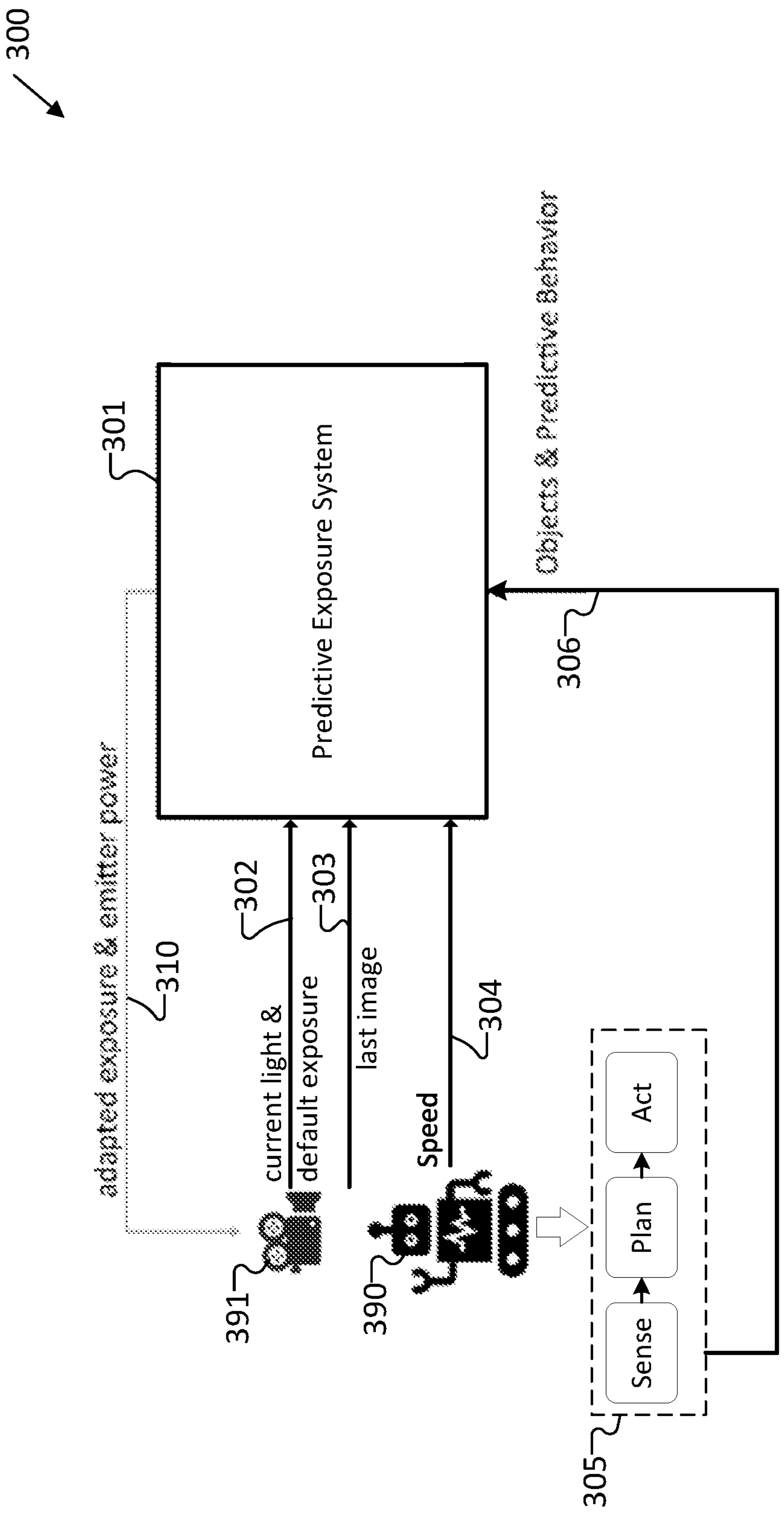
FIG. 3 depicts an example of a predictive imaging system that may use estimated motion to improve image quality.

FIG. 3 shows a schematic view of a predictive imaging system 300. Similar to predictive imaging system 200, predictive imaging system 300 may use a predictive exposure system 301 to determine configuration parameters for an imaging device 391 (e.g., a camera, depth camera, infrared camera, and/or other imaging system that has an image sensor to capture the scene). Predictive exposure system 301 may receive information related to a scene that is to be captured by the imaging device 391 and determine configuration parameters (e.g., for a prediction time at which the capture is to occur) for the imaging device 391 (e.g., to use for the capture at the prediction time).

For example, the predictive exposure system 301 may, at 302, receive (e.g., from the imaging device 391) information about the light levels at the scene and may also receive default exposure settings for those light levels. Predictive exposure system 301 may also, at 303, receive the last image and/or information about the last image captured by the imaging device 391. To the extent the imaging device 391 is attached to a vehicle, for example a mobile robot 390 that utilizes a sensing system 305 for navigation, positioning, autonomous driving, and/or safety checking, etc. (e.g., to sense, plan, act), the mobile robot 390 may posses a rich set of information about the environment, objects in the environment, the expected movements of objects within the environment, and the planed movements/routes of the mobile robot 390 within the environment. This rich set of information about the objects within the environment (e.g., their location, speed, expected trajectory, etc.) and about the plans of the mobile robot (e.g., its location, speed, expected trajectory, etc.) may also be provided to, at 304 and 306, and used by the predictive exposure system 301 to determine the relative movement of the scene that is to be captured.

Figure 4:
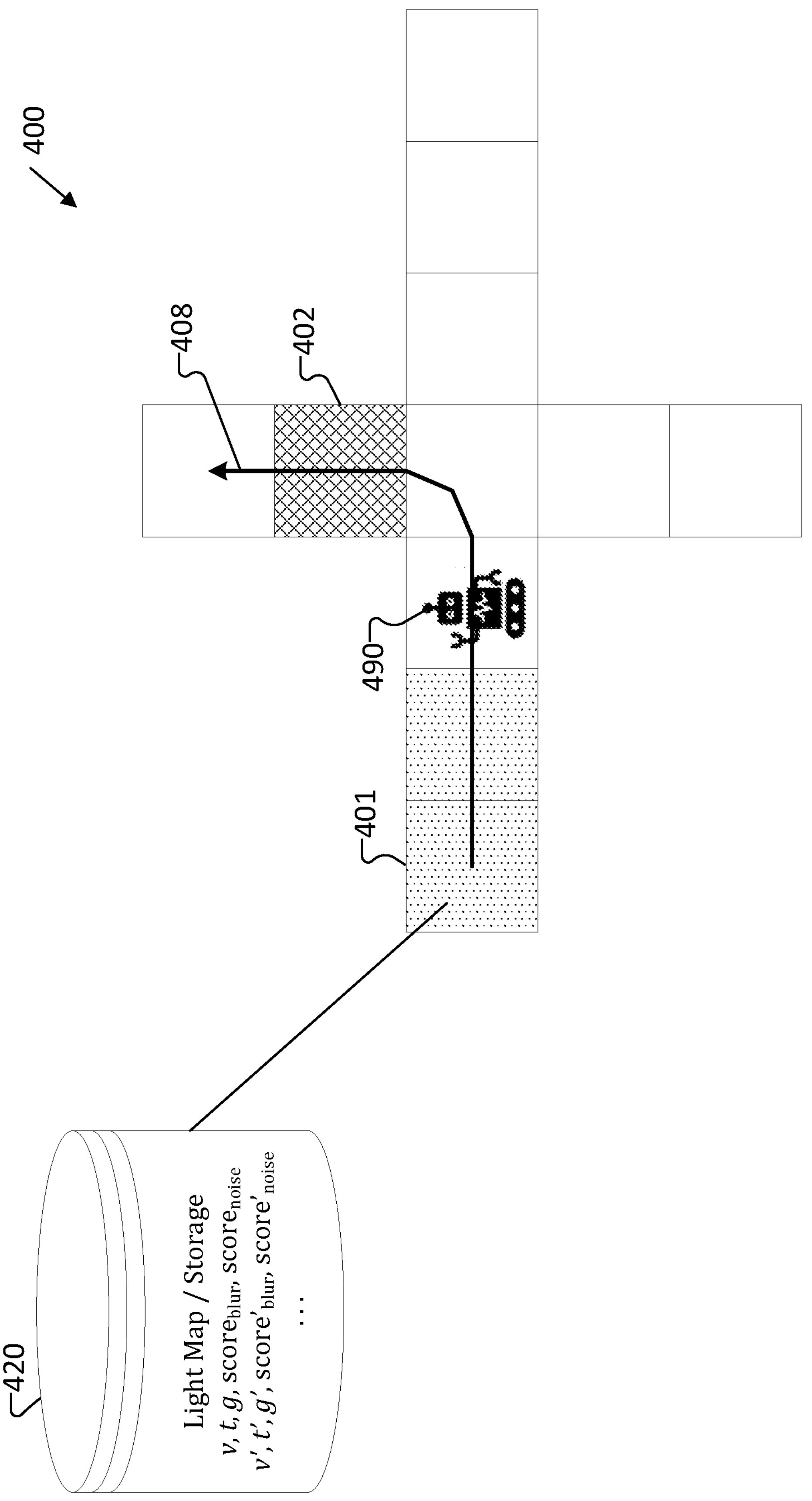
FIG. 4 shows an example of a map of an environment that a predictive imaging system may use to determine exposure-related settings.

FIG. 4 depicts an example scene 400 for how the predictive imaging system (e.g., predictive imaging system 200, 300) may utilize and/or update a stored map 420 of expect light conditions, predefined exposure settings, etc. for the area in which the predictive imaging system is operating. For example, a mobile robot 490 operating in a fixed area (e.g., a factory environment) may utilize the information in the map 420 to quickly obtain preferred exposure settings for the imaging device of the mobile robot 490 with respect to particular locations in the fixed area (e.g., a collection of cells representing the fixed area). For example, the map 420 may include expected light conditions for a particular subregion (e.g., cell) of the fixed area, along with predefined exposure settings (t, v), quality scores (e.g., a blur score ($score_{blur}$), a noise score ($score_{noise}$), etc.) associated with those settings and under those conditions (e.g., at a relative movement v) in which they were scored.

In the example shown in FIG. 4, the operating environment of mobile robot 490 is shown by the collection of cells representing the operating environment (e.g., where exemplary cells 401 and 402 are part of the collection of cells representing the environment or fixed area in which the mobile robot 490 is operating), where each cell may be associated with an entry of stored information in the stored map 420. For example, cell 401 may have different light conditions and therefore different predefined exposure settings (e.g., brighter light and a longer exposure time) as compared to cell 402 (e.g., which may have darker light conditions and therefore a shorter exposure time) that are stored in map 420. As the mobile robot 490 moves along its planned trajectory 408, the predictive imaging system may utilize in advance the stored map 420 information to determine the imaging device configuration settings corresponding to the next cell into which the mobile robot 490 may be moving. Consequently, when mobile robot 490 moves quickly through the environment, the predictive imaging system may be able to quickly provide the imaging device with exposure settings that result in an image with reduced motion blur for the particular area of the map 420 that it is about to be captured.

In addition, after the mobile robot 490 has captured an image in a particular location, mobile robot 490 may send current information about the captured image in order to update the information stored in map 420. For example, if the actual light conditions, exposure settings, relative movement, quality scores, etc. of the captured image differ from what is stored in map 420, the predictive imaging system may update map 420 to reflect the new parameters.

Figure 5:
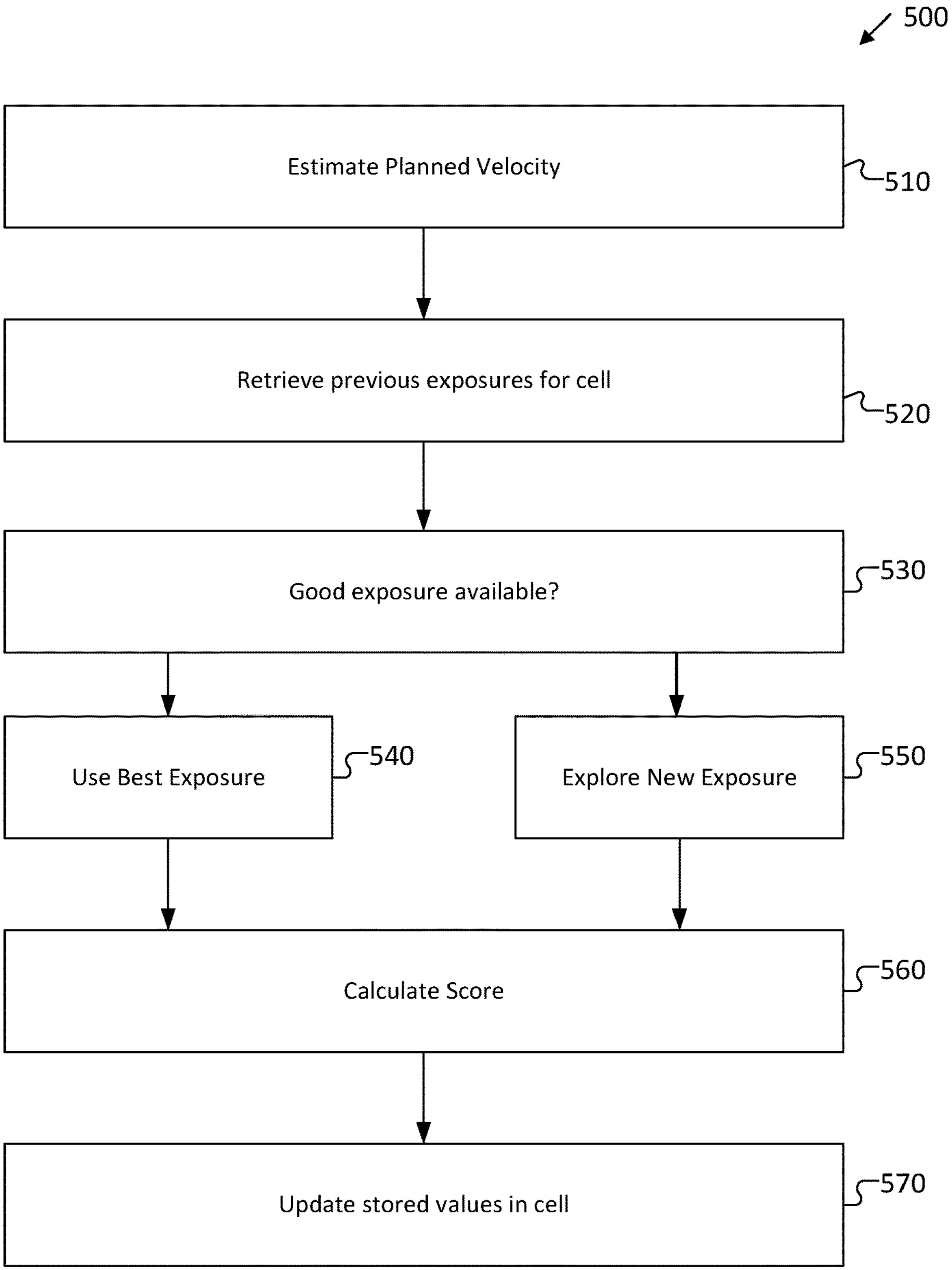
FIG. 5 illustrates an exemplary flow diagram of a predictive imaging system that may use and update map-based information to determine exposure related-settings.

FIG. 5 shows an exemplary flowchart 500 for how the predictive imaging system (e.g., predictive imaging system 200, 300) may utilize and/or update a stored map of light information/configuration settings (e.g., in map 420). As should be appreciated, the predictive imaging system may not always be able to provide an optimal exposure setting because actual conditions when the scene is captured may not reflect predicted conditions for what was expected at the scene. For example, light conditions may vary at the time of capture and/or different objects than expected may be moving within the scene at the time of capture. Nevertheless, the predictive imaging system may be able to utilize, especially in environments where the light conditions may vary spatially but do not change much over time, predefined (e.g., optimal) exposure settings for a given location in a fixed environment that may be updated/maintained as the robot (or robots) in the environment takes new captures of the given location.

With reference to flowchart 500, for a mobile robot operating in a given environment, the predictive imaging system may, in 510, estimate a planned velocity for a given location (e.g., associated with a cell on a map of the environment) that is an upcoming location along the robot's estimated/planned trajectory in the environment. Then, the predictive imaging system may, in 520, retrieve previous light conditions and the previous exposure settings for that upcoming location. The robot may then evaluate, in 530, the previous information to determine whether (given the robot's expected conditions at the upcoming location) the robot is expected to be able to capture the scene with sufficient quality (e.g., with a sufficient score for blurring and/or noise). If so, the robot may then, in 540 use the stored exposure settings for the capture in the upcoming location, and if not, the robot may, in 550, determine modified exposure settings for the capture in the upcoming location. After the capture, the predictive imaging system may then, in 560, determine the quality score(s) (e.g., blur score, noise score, etc.) for the actual capture at the location and, in 570, update the map with updated information (e.g., actual lighting conditions, exposures settings, relative movement, quality scores, etc.) for that location.

Figure 6:
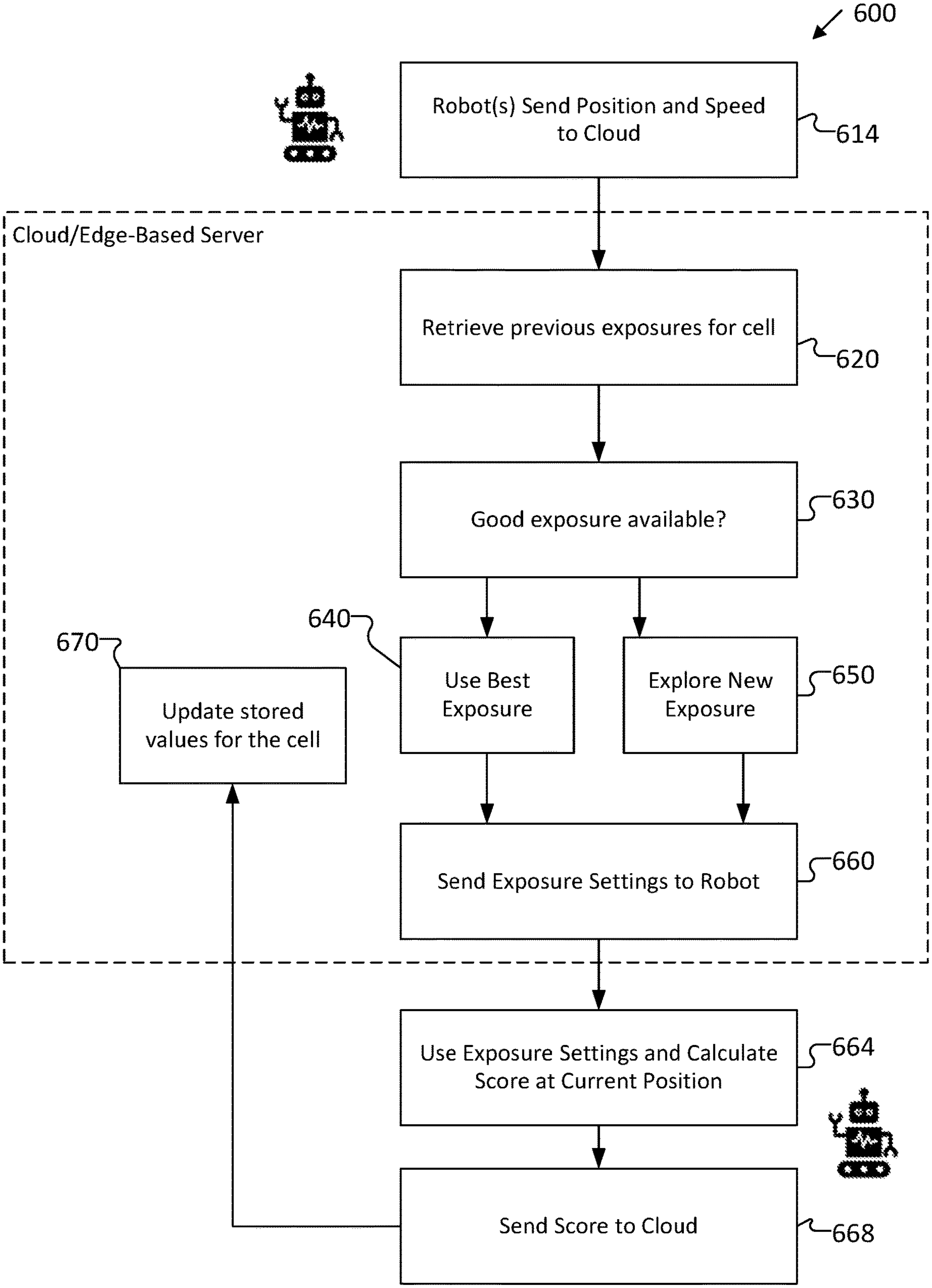
FIG. 6 illustrates an exemplary flow diagram of a predictive imaging system that may be distributed between a robot and a server external to the robot.

As should be appreciated, the predictive imaging system may be distributed, where some of the functions of the system may be performed by the robot and other portions may be performed by a server external to the robot (e.g., in a cloud-computing or edge-computing platform). Information may be shared between the robot and the external server using a communication connection (e.g., a wireless and/or wired connection via a wireless transmitter, receiver, and/or transceiver). An example of such a distributed system is depicted in FIG. 6, where some portions of the predictive imaging system 600 may be performed by the robot (e.g., a vehicle, mobile robot, smartphone, etc.) and some portions may be performed by a sever external to the robot. In the example of FIG. 6, functions 614, 664, and 668 may be performed by the robot whereas functions 620, 630, 640, 650, 660, and 670 may be performed by the server external to the robot (e.g., the cloud- or edge-computing platform). The robot may, in 614, send its position information, speed information, etc. to an external server (e.g. a cloud-based server).

The external server may use the information to determine/extract an expected location of the robot for a future point it time (the prediction time) and, in 620, retrieve the previously stored light conditions/exposure information for that expected location. The external server may then evaluate, in 630, the previously stored information to determine whether (given the robot's expected conditions at the upcoming location) the robot is expected to be able to capture the scene with sufficient quality (e.g., with a sufficient score for blurring and/or noise) if using the previously stored exposure values. If so, the external server may then, in 640 select the stored exposure settings for the robot to use in the upcoming location. If not, the external server may explore and determine, in 650, modified exposure settings for robot to use in the upcoming location. After exposure setting have been selected, the external server may, in 660, send the selected exposure settings to the robot for use in capturing the scene at the upcoming location and the prediction time. Then the robot may, in 664, use the received exposure settings to capture the scene at the location and score the quality of the actually captured scene (e.g., blur score, noise score, etc.). The robot may, in 668, send the quality scores to the external server. Then, the external server may update the map with updated information (e.g., actual lighting conditions, exposures settings, relative movement, quality scores, etc.) for that location.

By utilizing a cloud-/edge-based server, the predictive imaging system 600 may utilize information from and provide exposure information to multiple robots, which may allow for improved parameter selection. As should be appreciated, this distribution of functions is merely exemplary and not meant to be limiting, and the functions of the predictive imaging system may be distributed in any manner across any number of locations/devices.

Figure 7:
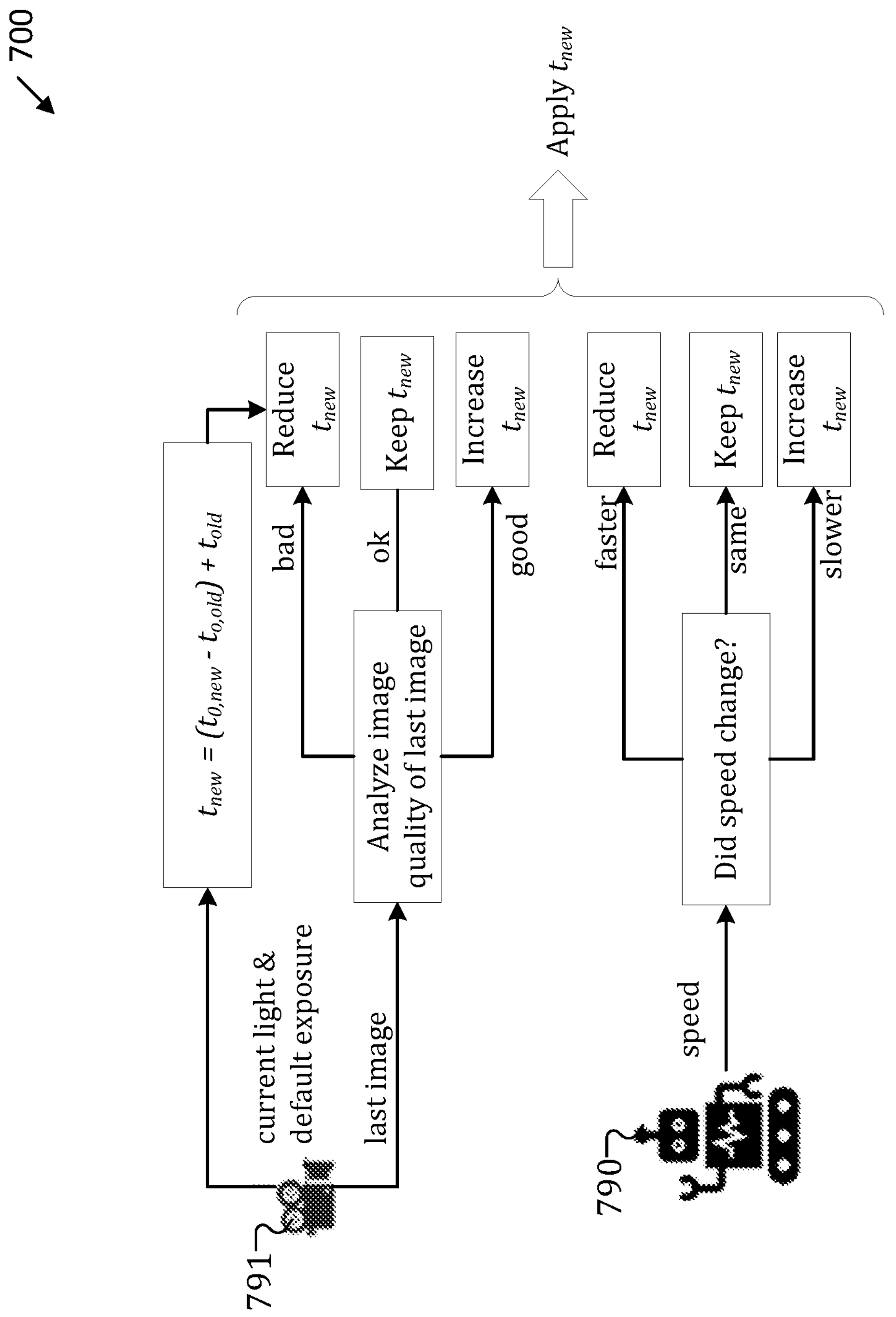
FIG. 7 illustrates an exemplary iterative, logical approach to determining new exposure duration based on differences between image quality and/or relative motion.

As mentioned above, the predictive imaging system may use logic (e.g., a fuzzy logic, greedy logic, and/or an AI-based algorithm) to iteratively determine optimal exposure settings, for example, based on predefined rule(s) associated with the inputs and/or outputs of the function. FIG. 7 shows one example of a fuzzy-logic approach 700 to predictively determining optimal exposure settings by analyzing the quality of the previously captured image (e.g., at a given location), and updating the exposure settings accordingly. While FIG. 7 is shown with respect to the length of exposure (e.g., exposure time t), this type of fuzzy logic may apply to any exposure setting.

For example, the predictive imaging system may analyze the amount of blur in the captured image (e.g., for a visual image, or, in the case of a depth image, the "blur" may be understood as the number of pixels with a not-a-number (NAN) and/or infinite (INF) value). The imaging device 791, for example, may provide the last image to the predictive imaging system, which may analyze the quality of the image (e.g., in terms of blur, noise, etc.) with respect to the exposure setting (e.g., exposure time t). If the blur quality is poor, for example, the predictive imaging system may reduce the exposure time t so that the capture is faster. If the blur quality is acceptable, the predictive imaging system maintain the same exposure time t. If the blur quality is good, the predictive imaging system may increase the exposure time t. In general, the higher the blur (and the lower the blur quality), the more aggressively the predictive imaging system may need to adjust the exposure time (or other exposure setting) in order to reduce the blur for the next capture. As should be appreciated, while blur has been discussed as one metric, other metrics may be optimized instead of or in addition to blur. For example, noise may be a quality metric that is optimized. It should be appreciated that improving one metric may come at the expense of another metric, and the predictive imaging system may need to balance/weigh the importance of a number of different metrics to the overall design. As should be appreciated, an image-based mobile robot perception system may be able to better handle images with high noise as compared to images with high blur, where numerous post-processing steps may be able to remove/reduce noise, e.g. through a gaussian filters or through AI-based algorithms.

In addition, the predictive imaging system may analyze the difference in speed (e.g., relative speed/motion) of robot 790 between its speed when the last image was captured and its expected speed for the next capture. If the speed of robot 790 is expected to increase, then this may have a downward effect on the new exposure time (e.g., reducing the exposure time to account for more motion). If the speed of robot 790 is expected to decrease, then this may have an upward effect on the new exposure time (e.g., increasing the exposure time because there is less motion). If the speed of robot 790 is to remain about the same, then this may have little to no effect on the exposure time (e.g., the same exposure time may be used).

As noted above, one of the exposure settings that the predictive imaging system may adjust for a to-be-captured scene is a power level of a light source (such as an LED emitter) associated with the image capture. For example, the imaging device (such as an image device with an IR emitter (e.g., an Intel® RealSense™ Depth Camera)) may have the ability to configure the power setting of its light source for the capture (e.g., similar to adjusting the brightness of a flash-bulb on a visual camera). The higher the power setting for the light source, the stronger/brighter the emitted light (e.g., the IR pattern). For example, in a depth camera, the IR pattern supports depth generation by using stereo IR sensors. So, in poor light conditions, the power setting of the light source may be increased, while in satisfactory light conditions, the power setting of the light source may remain constant or be reduced. In this regard, it should be understood that higher IR emitter power settings are likely to consume more energy than lower IR emitter power settings, and it may be desirable to use the lowest IR emitter power setting needed to obtain the desired level of quality. In addition, higher IR emitter power settings may also overheat the imaging device, which may in turn lead to higher noise in the captured image.

To determine whether the current IR emitter power setting (e.g. of a depth camera) is sufficient or should be increased/decreased, the predictive imaging system may make use of the depth image fill rate per region. For this purpose, the predictive imaging system may split the image into different tiles and, for each tile, the predictive imaging system may calculate the fill rate, where the fill rate rf may be defined as:

$$r_f = 1 - \frac{\text{undefined pixels}}{\text{total pixels}}$$

where undefined pixels may be the number of total pixels with a not-a-number (NAN) and/or infinite (INF) value.

Figure 8:
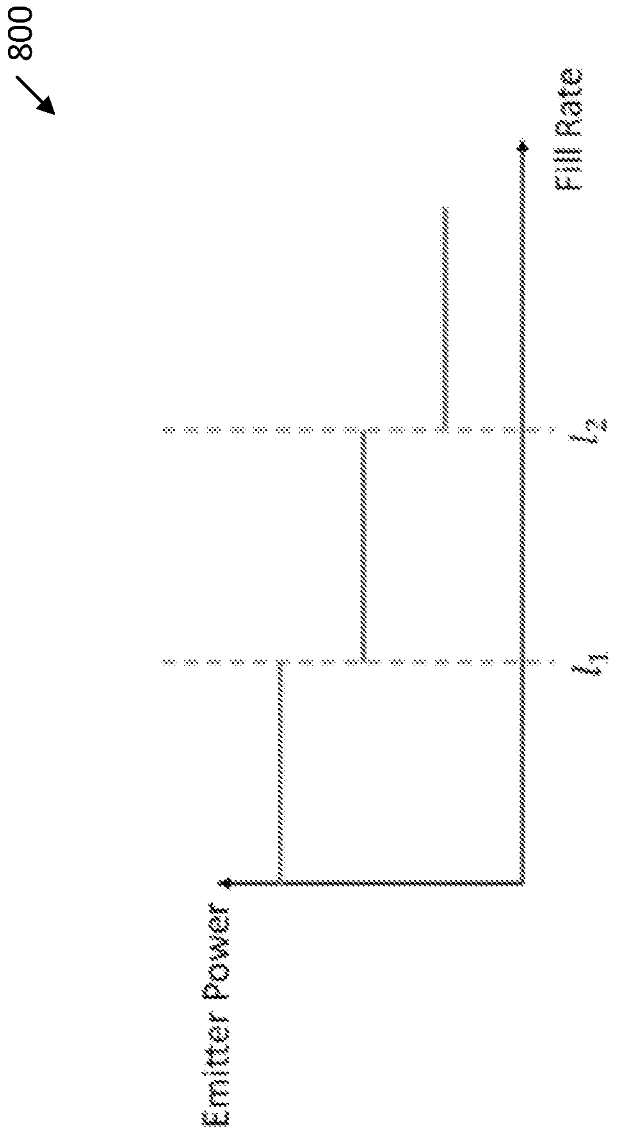
FIG. 8 illustrates an exemplary relationship between predefined thresholds for fill rate and emitter power of a light source of an imaging device.

For example, as shown in FIG. 8, which is a plot 800 of emitter powers at different fill rates, if the fill rate in a specific tile or region of interest is below a predefined threshold level (e.g., $l_1$), the predictive imaging system may increase the emitter power. If the fill rate is above a second predefined threshold level ($l_2$), the predictive imaging system may reduce the emitter power. While FIG. 8 shows just one example with just two predefined thresholds and three corresponding emitter power settings, it should be understood that any type of fill rate to emitter power relationship may be used with any number of emitter power settings and any number of predefined thresholds.

In the following, various examples are provided that may include one or more features of the predictive imaging systems described above (e.g., predictive imaging system 200, predictive imaging system 300) and/or with respect to FIGS. 1-8. It may be intended that features described in relation to the devices may apply also to the described method(s), and vice versa.

Example 1 is a device including a processor configured to determine a motion of a scene that is to be captured by an image sensor. The processor is also configured to determine a configuration setting of an imaging device including the image sensor, wherein the configuration setting is based on the determined motion of the scene. The processor is also configured to generate an instruction for the imaging device to capture the scene using the determined configuration setting.

Example 2 is the example of example 1, wherein the determined motion includes a relative movement of at least one object (e.g. a static object (e.g., a wall, a house, etc.) and/or a dynamic object (e.g., a moving pedestrian, a moving vehicle, etc.)) within the scene relative to the imaging device.

Example 3 is the example of example 2, wherein the processor is configured to determine the relative movement based on a predicted motion at a prediction time of the at least one object within the scene and/or based on an expected motion of the imaging device at the prediction time.

Example 4 is the example of example 3, wherein the processor is configured to determine the expected motion of the imaging device based on a planned trajectory of the imaging device at the prediction time.

Example 5 is the example of either one of examples 3 or 4, wherein the processor is configured to determine the predicted motion of the at least one object based on an object motion analysis of the at least one object at the prediction time with respect to the scene.

Example 6 is the example of any one of examples 3 to 5, wherein the imaging device is connected to a (e.g., autonomous) vehicle including a robot, an automobile, or a drone.

Example 7 is the example of any one of examples 2 to 6, wherein the relative movement of the at least one object relative to the imaging device includes at least one of: a relative rotational velocity of the at least one object relative to the image sensor, a relative translational velocity (e.g., longitudinal, latitudinal, etc.) of the at least one object relative to the image sensor, a relative heading of the at least one object relative to the image sensor, and a relative distance between the at least one object and the image sensor.

Example 8 is the example of any one of examples 1 to 7, wherein the processor configured to determine the configuration setting includes the processor configured to search for the configuration setting in a lookup table of configuration settings, each associated with an estimated motion, where the estimated motion matches the determined motion.

Example 9 is the example of any one of examples 1 to 8, wherein the processor configured to determine the configuration setting of the imaging device based on the determined motion includes the processor configured to determine a plurality of exposure times, each associated with a relative motion of the scene relative to the image sensor, herein the processor is configured to select a selected exposure time from among the plurality of exposure times as the configuration setting based on a predefined selection criterion.

Example 10 is the example of example 9, wherein the predefined selection criterion includes a smallest exposure time of the plurality of exposure times.

Example 11 is the example of any one of examples 1 to 10, wherein the imaging device includes a vision camera, an infrared camera, or a depth camera.

Example 12 is the example of any one of examples 1 to 11, wherein the configuration setting of the imaging device includes at least one of an exposure time, an aperture size, a focal length, a gain of the image sensor, a light level at the scene, and an illumination level of a light source on the scene.

Example 13 is the example of any one of examples 1 to 12, wherein the exposure time is a function of at least one of: the aperture size, the focal length, a size of the image sensor, a velocity of the motion, a directional heading of the motion, a distance to at least one object in the scene from the image sensor, a default exposure time for a light level of the scene, and a default gain for the light level of the scene.

Example 14 is the example of either one of examples 12 or 13, wherein the light source includes an emitter (e.g., an IR emitter) of the imaging device.

Example 15 is the example of either one of examples 13 or 14, wherein the processor is configured to determine the illumination level of the light source based on a depth image fill rate of a previously captured image of the scene that is associated with the configuration setting.

Example 16 is the example of any one of examples 1 to 15, wherein the processor is configured to determine the configuration setting based on a stored exposure setting associated with a location of the scene.

Example 17 is the example of example 16, wherein the processor is configured to determine the configuration setting based on an image quality score associated with the stored exposure setting.

Example 18 is the example of example 17, wherein the image quality score includes a level of image blur associated with the stored exposure setting.

Example 19 is the example of either of examples 17 or 18, wherein the image quality score includes a level of image noise associated with the stored exposure setting.

Example 20 is the example of either of examples 18 or 19, wherein the stored exposure setting includes at least one of: a stored exposure time, a stored aperture size, a stored focal length, a stored image sensor gain, and a stored light level of the scene.

Example 21 is the example of any one of examples 1 to 20, wherein the processor is further configured to generate a map of predefined exposure settings within an environment wherein the environment includes at least the location.

Example 22 is the example of example 21, wherein the map divides the environment into a plurality of subregions, wherein at least one of the plurality of subregions includes at least the location, wherein each subregion has a predefined exposure setting, an associated relative motion on which the predefined exposure setting is based, and an associated quality score.

Example 23 is the example of example 22, wherein the processor is further configured to identify a selected subregion from among the plurality of subregions in the map based on comparing the location to the plurality of subregions, wherein the processor is configured determine the configuration setting based on the predefined exposure setting for the selected subregion.

Example 24 is the example of example 23, wherein the processor is configured to adjust the configuration setting to an adjusted configuration setting based on comparing the associated relative motion of the predefined exposure setting for the selected subregion with respect to the determined motion.

Example 25 is the example of example 24, wherein the processor is configured to update, in the map, the predefined exposure setting for the selected subregion based on the adjusted configuration setting and/or the determined motion.

Example 26 is the example of any one of examples 21 to 25, wherein the processor is further configured to update the predefined exposure settings in the map based on the determined motion or an image quality score of a captured image of the scene captured using the configuration setting.

Example 27 is the example of any one of examples 1 to 26, wherein the device further includes the imaging device.

Example 28 is the example of any one of examples 1 to 27, wherein the device further includes a memory configured to store at least one of: the determined motion, the scene captured by the imaging device, the configuration setting, the determined motion, and the instruction.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising a processor configured to:
- determine a motion of a scene that is to be captured by an image sensor;
- determine a configuration setting of an imaging device comprising the image sensor, wherein the configuration setting is based on the determined motion of the scene; and
- generate an instruction for the imaging device to capture the scene using the determined configuration setting, wherein the processor configured to determine the configuration setting of the imaging device comprises the processor configured to:
  - determine a plurality of exposure times, each associated with a relative motion of the scene relative to the image sensor; and
  - select a selected exposure time from among the plurality of exposure times as the determined configuration setting based on a predefined selection criterion.

2. The device of claim 1, wherein the determined motion comprises a relative movement of at least one object within the scene relative to the imaging device.

3. The device of claim 2, wherein the processor is configured to determine the relative movement based on a predicted motion at a prediction time of the at least one object within the scene or based on an expected motion of the imaging device at the prediction time.

4. The device of claim 3, wherein the processor is configured to determine the expected motion of the imaging device based on a planned trajectory of the imaging device at the prediction time.

5. The device of claim 3, wherein the processor is configured to determine the predicted motion of the at least one object based on an object motion analysis of the at least one object at the prediction time with respect to the scene.

6. The device of claim 2, wherein the relative movement of the at least one object relative to the imaging device comprises at least one of: a relative rotational velocity of the at least one object relative to the image sensor, a relative translational velocity of the at least one object relative to the image sensor, a relative heading of the at least one object relative to the image sensor, and a relative distance between the at least one object and the image sensor.

7. The device of claim 1, wherein the configuration setting of the imaging device comprises at least one of an exposure time, an aperture size, a focal length, a gain of the image sensor, a light level at the scene, and an illumination level of a light source on the scene.

8. The device of claim 7, wherein the exposure time is a function of at least one of: the aperture size, the focal length, a size of the image sensor, a velocity of the motion, a directional heading of the motion, a distance to at least one object in the scene from the image sensor, a default exposure time for the light level, and a default gain for the light level.

9. An apparatus comprising:
- a means for determining a motion of a scene that is to be captured by an image sensor;
- a means for determining a configuration setting of an imaging device comprising the image sensor, wherein the configuration setting is based on the determined motion of the scene; and
- a means for generating an instruction for the imaging device to capture the scene using the determined configuration setting, wherein the means for determining the configuration setting of the imaging device comprises:

a means for determining a plurality of exposure times, each associated with a relative motion of the scene relative to the image sensor; and a means for selecting a selected exposure time from among the plurality of exposure times as the determined configuration setting based on a predefined selection criterion.

10. The apparatus of claim 9, wherein the means for determining the configuration setting comprises a means for determining the configuration setting based on a stored exposure setting associated with a location of the scene.

11. The apparatus of claim 10, wherein the means for determining the configuration setting comprises a means for determining the configuration setting based on an image quality score associated with the stored exposure setting.

12. The device apparatus of claim 11, wherein the image quality score comprises a level of image blur associated with the stored exposure setting or a level of image noise associated with the stored exposure setting.

13. The apparatus of claim 12, wherein the stored exposure setting comprises at least one of: a stored exposure time, a stored aperture size, a stored focal length, a stored image sensor gain, and a stored light level of the scene.

14. A non-transitory, computer-readable medium comprising instructions which, if executed, cause one or more processors to:

determine a motion of a scene that is to be captured by an image sensor;

determine a configuration setting of an imaging device comprising the image sensor, wherein the configuration setting is based on the determined motion of the scene; and generate an instruction for the imaging device to capture the scene using the determined configuration setting, wherein the instructions that cause the one or more processors to determine the configuration setting of the imaging device further cause the one or more processors to:

determine a plurality of exposure times, each associated with a relative motion of the scene relative to the image sensor; and select a selected exposure time from among the plurality of exposure times as the determined configuration setting based on a predefined selection criterion.

15. The non-transitory, computer-readable medium of claim 14, wherein the instructions further cause the one or more processors to determine the configuration setting based on a stored exposure setting associated with a location of the scene, wherein the instructions further cause the one or more processors to generate a map of predefined exposure settings within an environment wherein the environment comprises at least the location.

16. The non-transitory, computer-readable medium of claim 15, wherein the map divides the environment into a plurality of subregions, wherein at least one of the plurality of subregions comprises at least the location, wherein each subregion has a predefined exposure setting, an associated relative motion on which the predefined exposure setting is based, and an associated quality score.

17. The non-transitory, computer-readable medium of claim 16, wherein the instructions further cause the one or more processors to identify a selected subregion from among the plurality of subregions in the map based on comparing the location to the plurality of subregions, wherein the instructions further cause the one or more processors to determine the configuration setting based on the predefined exposure setting for the selected subregion.

18. The non-transitory, computer-readable medium of claim 17, wherein the instructions further cause the one or more processors to adjust the configuration setting to an adjusted configuration setting based on comparing the associated relative motion of the predefined exposure setting for the selected subregion with respect to the determined motion.

19. The non-transitory, computer-readable medium of claim 18, wherein the instructions further cause the one or more processors to update, in the map, the predefined exposure setting for the selected subregion based on the adjusted configuration setting and/or the determined motion.

* * * * *